United States Patent
Lee

(10) Patent No.: US 9,396,333 B1
(45) Date of Patent: Jul. 19, 2016

(54) THIN CLIENT FOR COMPUTER SECURITY APPLICATIONS

(71) Applicant: Trend Micro Incorporated, Tokyo (JP)

(72) Inventor: Wei-Chung Lee, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 239 days.

(21) Appl. No.: 13/932,339

(22) Filed: Jul. 1, 2013

Related U.S. Application Data

(60) Division of application No. 13/324,800, filed on Dec. 13, 2011, now Pat. No. 8,505,101, which is a continuation of application No. 11/807,727, filed on May 30, 2007, now Pat. No. 8,127,358.

(51) Int. Cl.
*G06F 12/14* (2006.01)
*G06F 21/56* (2013.01)

(52) U.S. Cl.
CPC .................................... *G06F 21/56* (2013.01)

(58) Field of Classification Search
CPC ..... G06F 21/56; G06F 21/561; G06F 21/562; G06F 21/563; G06F 21/564
USPC ...................................................... 726/22, 24
See application file for complete search history.

(56) References Cited

U.S. PATENT DOCUMENTS

| | | | |
|---|---|---|---|
| 6,973,578 B1* | 12/2005 | McIchionc | 726/24 |
| 7,496,963 B2* | 2/2009 | Shipp | G06F 21/563 713/187 |
| 7,761,605 B1* | 7/2010 | Rothwell | G06F 21/566 709/250 |
| 8,726,388 B2* | 5/2014 | Turbin | G06F 21/566 726/24 |
| 2006/0288416 A1* | 12/2006 | Costea et al. | 726/24 |
| 2011/0067109 A1* | 3/2011 | Costea | G06F 21/564 726/24 |
| 2011/0179491 A1* | 7/2011 | Spurlock | G06F 21/564 726/24 |

OTHER PUBLICATIONS

On the Statistical Distribution of Processing Times in Network Intrusion Detection, Cabrera et al, IEEE, 2004.*
Content based file type detection algorithms, McDanel et al, IEEE, 2003.*

* cited by examiner

*Primary Examiner* — Luu Pham
*Assistant Examiner* — Jahangir Kabir
(74) *Attorney, Agent, or Firm* — Okamoto & Benedicto LLP

(57) ABSTRACT

A system for scanning a file for malicious codes may include a client agent running in a client computer and a scan server running in a server computer, the client computer and the server computer communicating over a computer network. The client agent may be configured to locally receive a scan request to scan a target file for malicious codes and to communicate with the scan server to scan the target file using a scan engine running in the server computer. The scan server in communication with the client agent allows the scan engine to scan the target file by issuing file I/O requests to access the target file located in the client computer. The client agent may be configured to check for digital signatures and to maintain a file cache of previously scanned files to minimize network traffic.

6 Claims, 9 Drawing Sheets

THIN CLIENT FOR COMPUTER SECURITY APPLICATIONS

REFERENCE TO RELATED APPLICATION

This application is a divisional of U.S. application Ser. No. 13/324,800, filed on Dec. 13, 2011, which is a continuation of U.S. application Ser. No. 11/807,727, filed on May 30, 2007. The just mentioned disclosures are incorporated herein by reference in their entirety.

BACKGROUND OF THE INVENTION

1. Field of the Invention

The present invention relates generally to computer security, and more particularly but not exclusively to methods and apparatus for detecting malicious codes.

2. Description of the Background Art

Computer viruses, worms, Trojans, rootkits, and spyware are examples of malicious codes that have plagued computer systems throughout the world. Malicious codes, which are also collectively referred to simply as "viruses," may be detected using antivirus techniques implemented in software, hardware, or a combination of hardware and software. Antivirus may be performed at a central server or at a client. Regardless of where antivirus is performed, the antivirus consumes local computing resources. Depending on the computing power of the computer where antivirus is performed, the computer may or may not be able to handle the amount of processing required for running the antivirus or the periodic downloading of increasingly larger patterns that may be required to detect malicious codes.

SUMMARY

A system for scanning a file for malicious codes may include a client agent running in a client computer and a scan server running in a server computer, the client computer and the server computer communicating over a computer network. The client agent may be configured to locally receive a scan request to scan a target file for malicious codes and to communicate with the scan server to scan the target file using a scan engine running in the server computer. The scan server in communication with the client agent allows the scan engine to scan the target file by issuing file I/O requests to access the target file located in the client computer. The client agent may be configured to check for digital signatures and to maintain a file cache of previously scanned files to minimize network traffic.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software. Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
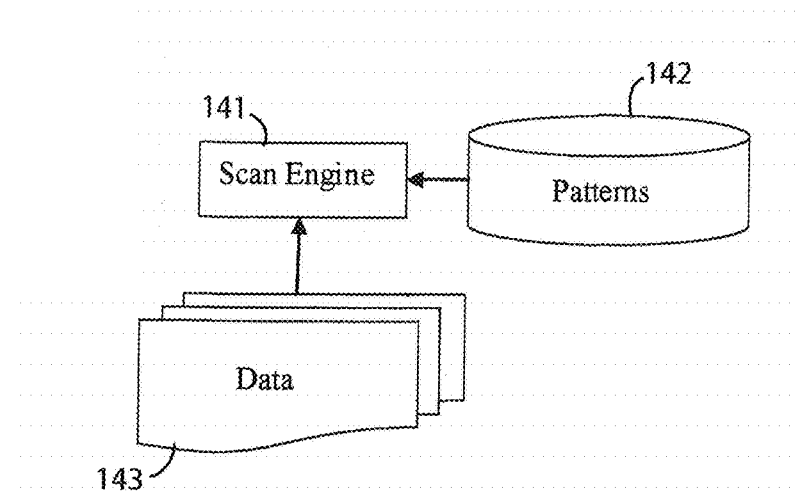
FIG. 1 schematically shows the configuration of an example antivirus.

FIG. 1 schematically shows the configuration of an example antivirus. In the example of FIG. 1, the antivirus includes a scan engine 141 and malicious code patterns 142. The patterns 142 may comprise patterns and other information for detecting malicious codes. In operation, the scan engine 141 scans data 143 for content matching one or more patterns in the patterns 142. This technique for detecting malicious codes is also referred to as "pattern matching." The patterns 142 are periodically updated to include the latest information on known malicious codes or vulnerabilities. Table 1 shows example contents of the patterns 142.

TABLE 1

| ID/Name | Offset to Reference Point | Code Length | Malicious Code Pattern |
|---|---|---|---|
| 1/VirusName1 | Nnn | Nn | Nn, nn, nn, nn, . . . |
| 2/VirusName2 | Nnn | Nn | Nn, nn, nn, nn, . . . |
| . . . | | | |

In the example of Table 1, the patterns 142 include an entry for each known malicious code. Each entry may include an identifier and name of the malicious code ("ID/Name"), an offset to a reference point for locating the malicious code in the data being scanned ("Offset to Reference Point"), the length of the malicious code ("Code Length"), and how the malicious code looks like ("malicious code pattern"). The information in the patterns 142 thus allows the scan engine 141 to go to a location in the data, grab data of particular length at that location, and compare the grabbed data to the pattern to determine whether or not the particular malicious code is present.

Figure 2:
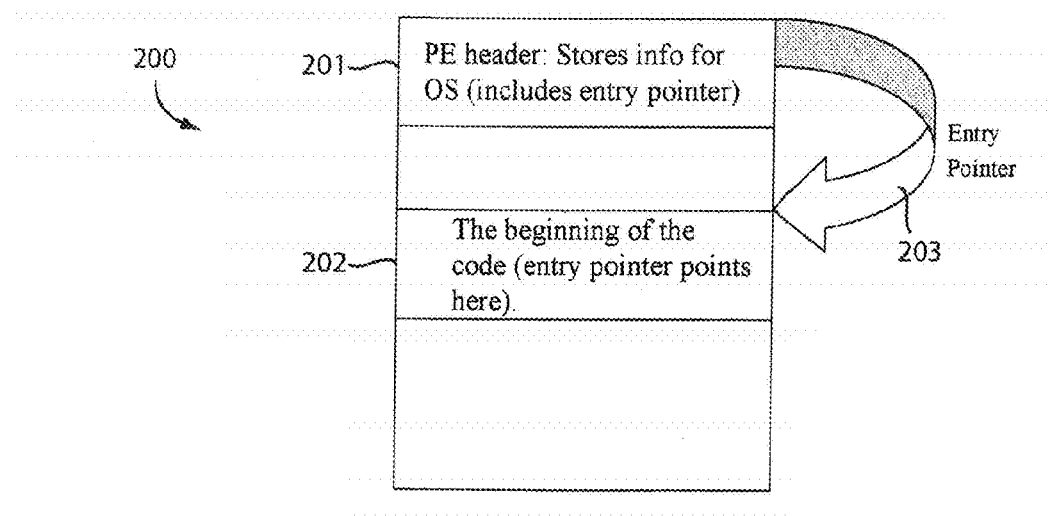
FIGS. 2 and 3 schematically illustrate how malicious code may infect a file.
Figure 3:
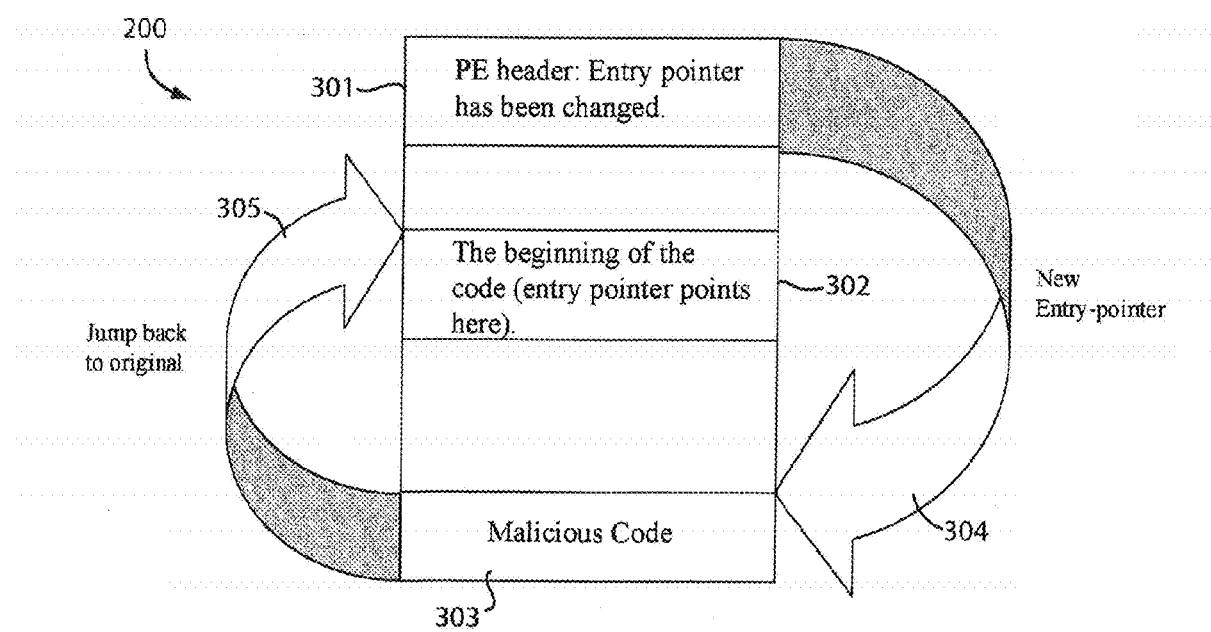

For example, for an executable file, the offset to reference point may be the entry point indicated in the PE header of the executable file. The PE header includes information that tells the operating system how to place the executable code in main memory and where to start running the executable code (i.e., the entry point). This is schematically illustrated in FIG. 2, where the PE header 201 of an executable file 200 includes a pointer (see arrow 203) to the entry point 202. A malicious code may infect an executable file by modifying the PE header to make the entry pointer point to the malicious code. This is schematically illustrated in FIG. 3 the where malicious code 303 infects the executable file 200 by modifying the PE header 301 such that the entry pointer points to the malicious code 303 (see arrow 304) instead of the entry point 302. After execution, the malicious code 303 may jump back to the entry point 302 (see arrow 305) to avoid detection.

In operation, the scan engine 141 may find the entry point of a target file and mark the entry point as a reference point for pattern matching. The scan engine 141 may then compare the content of the target file to the malicious code pattern at a given offset. If the content of the target file matches the malicious code pattern, the scan engine 141 will raise an alert that a malicious code has been found and provide the identifier or name of the malicious code to the module that requested scanning of the target file. Various cleaning steps may be performed upon detection of a malicious code including quarantine, disinfection, removal, alerting the user or administrator, and so on.

Preferably, for performance and precision reasons, the scan engine 141 does not scan the entirety of a file, but instead only scan a portion of the file that may carry malicious code. For example, in scanning a Microsoft Office™ file for malicious codes, the scan engine 141 may only scan Macro-Script sections that can carry malicious code. Accordingly, the scan engine 141 only needs to retrieve those sections for comparison to patterns in the patterns 142.

Figure 4:
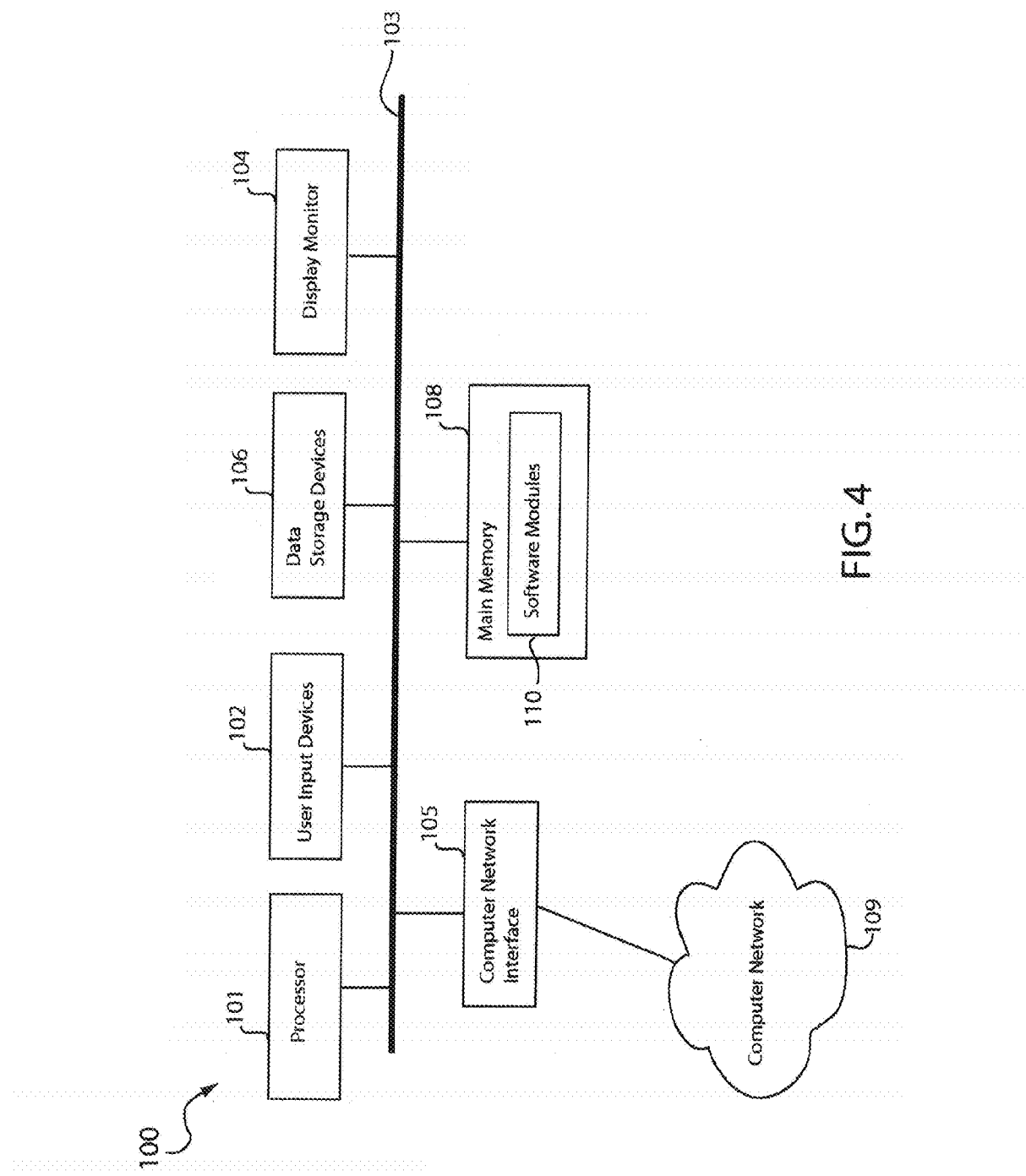
FIG. 4 shows a schematic diagram of a computer that may be employed in embodiments of the present invention.

Referring now to FIG. 4, there is shown a schematic diagram of a computer 100 that may be employed in embodiments of the present invention. The computer 100 may be configured as a later described computer 550 or 570. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM).

In the example of FIG. 4, the main memory 108 includes software modules 110, which may be software components of the computer 550 or 570. The software modules 110 may be loaded from the data storage device 106 to the main memory 108 for execution by the processor 101. The computer network interface 105 may be coupled to a computer network 109.

Figure 5:
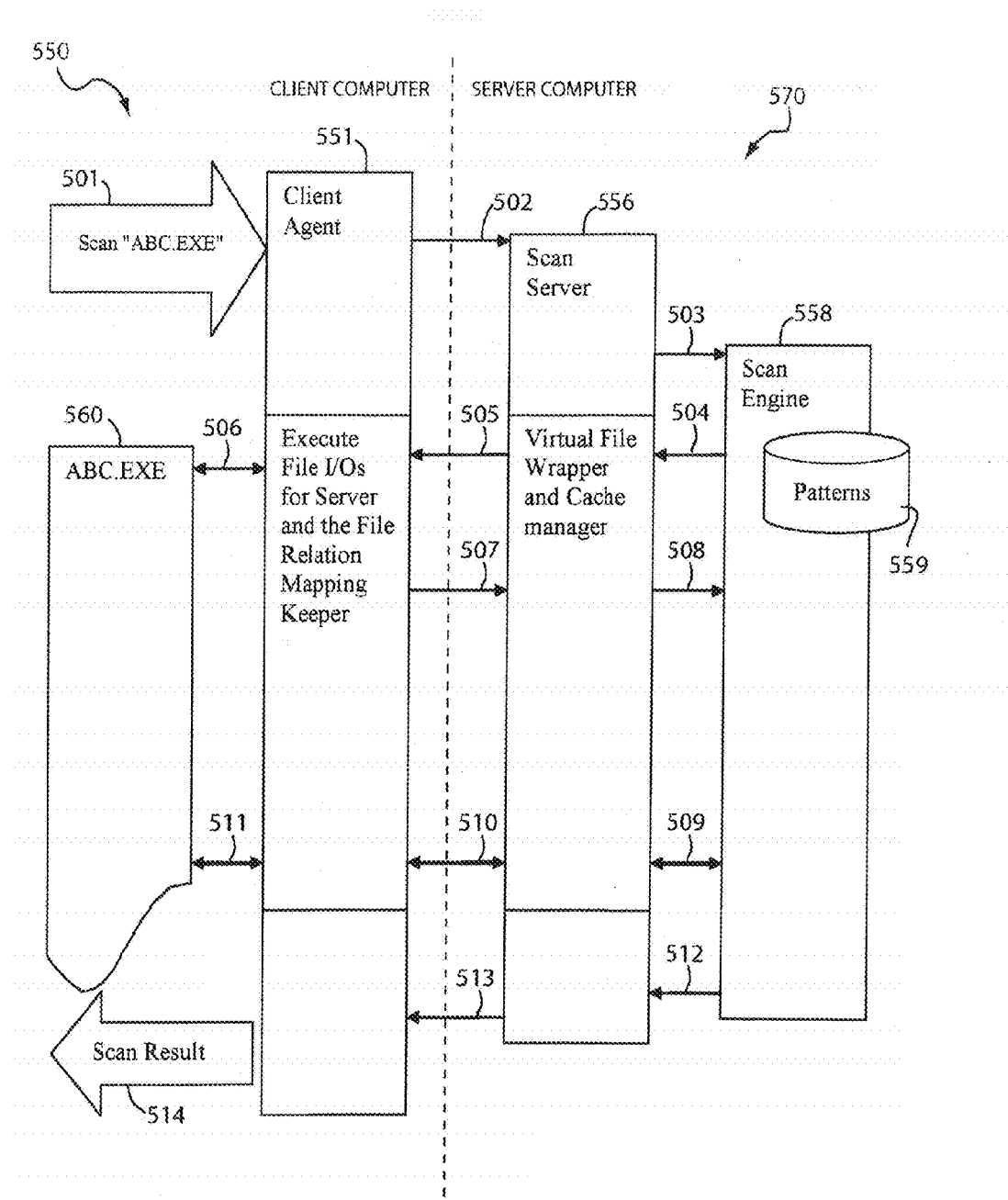
FIG. 5 schematically shows a system for scanning files for malicious codes in accordance with an embodiment of the present invention.

FIG. 5 schematically shows a system for scanning files for malicious codes in accordance with an embodiment of the present invention. In the example of FIG. 5, the system includes a client computer 550 and a server computer 570 communicating over a computer network. There may be one or more computers 550 and 570 in a given network but only one is shown in FIG. 5 for clarity of illustration. For example, there may be several server computers 570 in a given network to allow a client computer 550 to send a scan request to one of many available server computers 570.

The client computer 550 may include a client agent 551. The client agent 551 may comprise computer-readable program code for receiving a scan request to scan a file (or other data) for malicious code, to coordinate scanning of the file using a remote server computer 570, and to return the scanning result to the requestor of the scan. In one embodiment, the client agent 551 is configured to execute file input/output (I/O) for a scan server 556 and to maintain file relationship mapping in the client computer 550. The client agent 551 may be implemented in a single module or several modules. Executing file I/O for the scan server 556 to scan a file, rather than providing the entire file to the scan server 556, advantageously reduces file transfer across the network by providing to the scan server 556 only those portions of the file where malicious code may be present as indicated in malicious code patterns 559.

The server computer 570 may include a scan server 556 and a scan engine 558. The scan server 556 may comprise computer-readable program code for receiving scan requests from a client agent 551, forward the scan request and associated information to the scan engine 558, and to forward the scan result to the client agent 551. The scan server 556 may be implemented in a single module or several modules.

In one embodiment, the scan server 556 includes a virtual file wrapper and a cache manager. The virtual file wrapper may dynamically change system calls of the file I/O of the scan engine 558 to allow the wrapper to receive the system calls and convert file access events to a structuralized data packet suitable for transmission to the client agent 551 over a computer network. For example, the virtual file wrapper may change functions in an import table for system calls in the scan engine 558, and replace the addresses of the functions to those of handlers in the virtual file wrapper.

The cache manager of the scan server 556 may maintain a read cache to reduce re-reading of the same data that may have to be resent over the network. This advantageously minimizes network bandwidth consumption. The read cache chain may keep a life-cycle from a file open operation to a file close operation. The read cache chain may be built beginning when a file is opened, and deleted when the file is closed. Each file cache chain item may keep copies of portions of the target file transmitted to the server computer 570, and record the target file's offset and length.

The scan engine 558 may comprise computer-readable program code or hardware logic to scan data for malicious codes. Similar to the patterns 142 of FIG. 1, the malicious code patterns 559 may comprise malicious code patterns and other information for detecting malicious codes. The scan engine 558 may employ the patterns 559 to perform a pattern matching to scan a file for malicious codes, as described with reference to the scan engine 141 and the patterns 142 of FIG. 1. In the example of FIG. 5, however, the scan engine 558 may scan a remotely located file, such as an executable file 560 in the client computer 550 without copying the entirety of the file 560 into the server computer 570.

In one embodiment, the scan server 556 receives from the scan engine 558 file I/O instructions to access the file 560 as if the file 560 is local to the scan engine 558. The scan server 556 converts these file I/O instructions into a form that can be transmitted to and understood by the client agent 551, which performs the file I/O instructions in the client computer 550. The client agent 551 performs the file I/O instructions, converts the results of the file I/O instructions into a form that can be transmitted to and understood by the scan server 556, which then converts the results of the file I/O instructions into a form that can be received and understood by the scan engine 558. This allows the scan engine 558 to scan the file 560 as if the file 560 is in the server computer 570 rather than in the client computer 550. Note that the scan engine 558 only needs to scan those portions of the file 560 where malicious code may be present as indicated by the patterns 559. That is, only portions, not the entirety, of the file 560 may need to be transmitted to the server computer 570 to scan the file 560 for malicious codes.

The functionalities of the client agent 551 and the scan server 556 are further explained with reference to FIG. 5, beginning with the receipt of a scan request in the client agent 551 (arrow 501). A calling module (not shown) may send the client agent 551 a request to scan a target file for malicious codes. The calling module may be an email program wanting to scan an email attachment, an operating system wanting to scan a file to be opened, a file I/O interception handler 711 (see FIG. 7), or other module. In the example of FIG. 5, the target file to be scanned is an executable file 560 ("AB-C.EXE"). As shown in FIG. 5, the file 560 is local to the client computer 550 where the client agent 551 is running. As will be more apparent below, to minimize the resource requirements of the client agent 551, making it a thin client, the client agent 551 may ask the scan engine 558 in the server computer 570 to scan the file 560. This form of virus scanning is also referred to herein as "scanning in the cloud."

Still referring to FIG. 5, the client agent 551 forwards the scan request to the scan server 556 over the computer network (arrow 502). The client agent 551 may pass this request to one of many scan servers 556 that are available in the network, although embodiments of the invention may be implemented with a single scan server 556 providing scanning service to one of many client agents 551. The scan server 556 receives the scan request from the client agent 551 and accordingly instructs the scan engine 558 to scan the file 560 (arrow 503). Because the file 560 is actually in the client computer 550, the scan server 556 provides the scan engine 558 a virtual file name of the file 560. The scan engine 558 performs file I/O operations on the file 560 by referring to it by its virtual file name, as if the file 560 is in the server computer 570. This advantageously allows existing scan engines and patterns to be used for scanning in the cloud with minimal modifications.

To scan the file 560 for malicious codes, the scan engine 558 initiates an open file I/O instruction to open the file 560 (referring to the file 560 by its virtual file name). The resulting open file I/O event is redirected to the virtual file wrapper of the scan server 556, which recognizes the virtual file name as that of the file 560 of a pending scan request from the client agent 551 (arrow 504). In response, the virtual file wrapper creates "file open command" packets containing the open file I/O instruction and other information for opening the file 560 in the client computer 550, and sends the file open command packets to the client agent 551 over the network (arrow 505). The client agent 551 receives the file open command packets, converts the file open command packets to a file open I/O request with the requisite relational information, such as file name (arrow 506). The operating system or other module of the client computer 550 services the file open I/O request, opening the file 560 for access. The client agent 551 receives the results of the file open I/O request, which may be a file handler. The client agent 551 puts the file handler into one or more packets for transmission to the scan server 556 (arrow 507). The virtual file wrapper of the scan server 556 receives the packets containing the file handler and returns a corresponding virtual file handler to the scan engine 558 (arrow 508). The file handler is the result of the open file I/O instruction previously sent by the scan engine 558 to start accessing the file 560 for scanning.

The just described procedure may be followed for all I/O events, including getting the length of the file 560, reading the file 560, closing the file 560 (after malicious code scanning), and so on. That is, for each file I/O instruction sent by the scan engine 558 (arrow 509), the scan server 556 converts the file I/O instruction into network packets for transmission to the client agent 551 (arrow 510), which then converts the network packets to file I/O requests to access the file 560 (arrow 511). The client agent 551 receives the results of the file I/O requests (arrow 511), converts the results of the file I/O requests into network packets for transmission to the scan server 556 (arrow 510), which then converts the network packets into file I/O results that are receivable and understandable by the scan engine 558 (arrow 509). Accordingly, the scan engine 558 may scan the file 560 as if it is local in the server computer 570, without transferring the entirety of the file 560 to the server computer 570. As can be appreciated, the scan engine 558 only has to access particular portions of the file 560, such as the PE header and portions indicated in the patterns 559 as possibly containing malicious codes. The portions may have a particular length and offset location identified in the patterns 559.

Upon completion of scanning the file 560 for malicious codes, the scan engine 558 may provide the result of the scanning to the scan server 556 (arrow 512). The scan server 556 converts the scan result into packets transmitted to the client agent 551 (arrow 513). The client agent 501 then returns the scan result to the calling module that requested the scanning (arrow 514).

Communications between the client agent 551 and the scan server 556 may incorporate data compression to reduce the amount of data transferred between them over the computer network. Because compression takes processing time, the compression may be limited to large data transfers such as those involving file read. For example, in one embodiment, the client agent 551 performs data compression only on results of file read instructions. In that case, the client agent 551 compresses the results of the file read instruction before forwarding the results to the scan server 556, which then decompresses the results in the computer 570.

In one embodiment a client agent 551 and a scan server 556 communicate over the network using HTTP (hypertext transfer protocol). Preferably, the HTTP protocol is a one way HTTP to minimize network communication issues relating to firewalls, routers, and network address translation (NAT). In one embodiment, only the HTTP port on the side of the scan server 556 (i.e., on the server computer 570) is open; an HTTP port need not be opened on the side of the client agent 551 (i.e., on the client computer 550).

Figure 6:
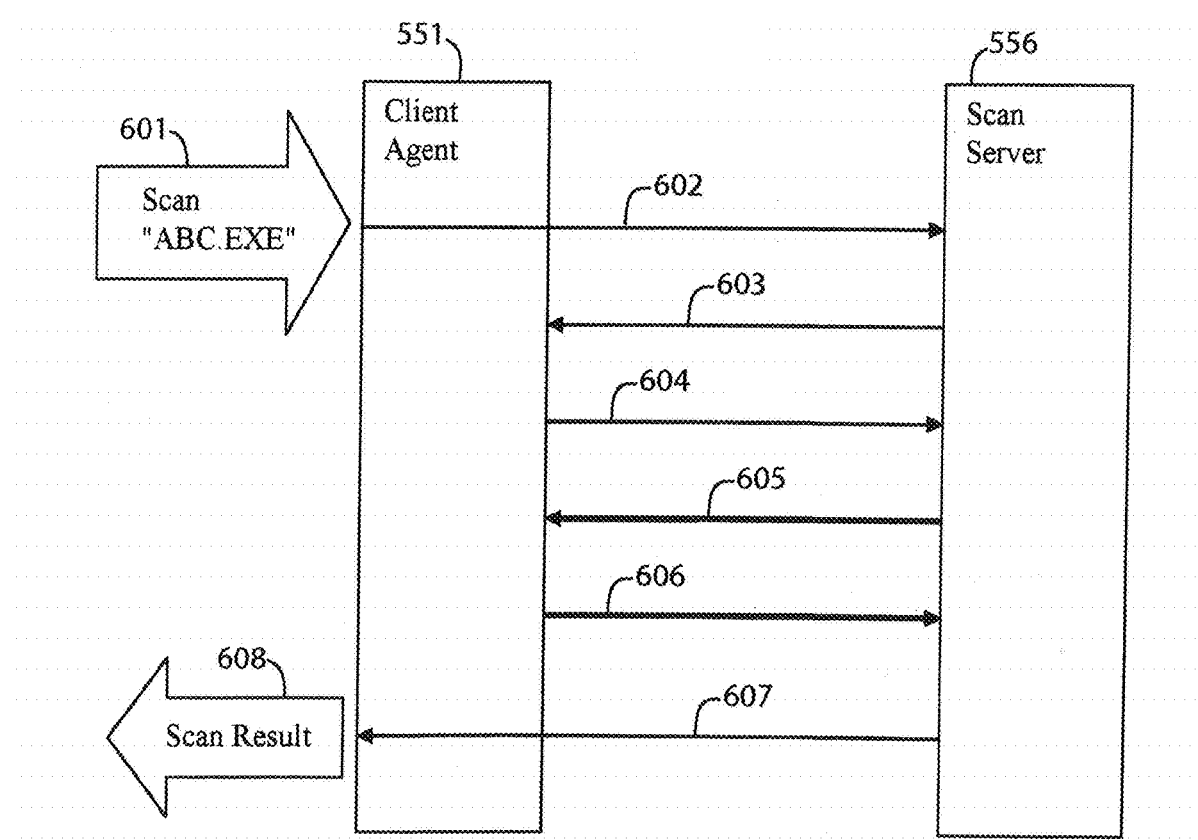
FIG. 6 shows a flow diagram illustrating HTTP communication between a client agent and a scan server in accordance with an embodiment of the present invention.

FIG. 6 shows a flow diagram illustrating HTTP communication between a client agent 551 and a scan server 556 in accordance with an embodiment of the present invention. As shown in FIG. 6, the client agent 551 may receive a scan request from a calling module (arrow 601). The client agent 551 forwards the scan request to the scan server 556 using an HTTP "PUT" (arrow 602). The scan server 556 includes an "open file command" in its response to the HTTP PUT to open the target file to be scanned (arrow 603). The client agent 551 issues another HTTP PUT to return the file handler of the target file to the scan server 556 (arrow 604). In its responses to HTTP PUT's from the client agent 551, the scan server 556 may include various file I/O instructions to manipulate the target file for scanning (arrow 605). The client agent 551 may issue an HTTP PUT (arrow 606) to allow the scan server 556 to respond with the result of the scanning (arrow 607). The client agent 551 receives the scanning result and forwards it to the calling module (arrow 608). Briefly, the client agent 551 and the scan server 556 may communicate using one way HTTP in a series of HTTP PUT's and responses.

Scanning in the cloud using the client agent 551 may be performed in conjunction with file behavior monitoring to increase protection against spread of malicious codes. This aspect of the present invention is now explained with reference to FIG. 7.

Figure 7:
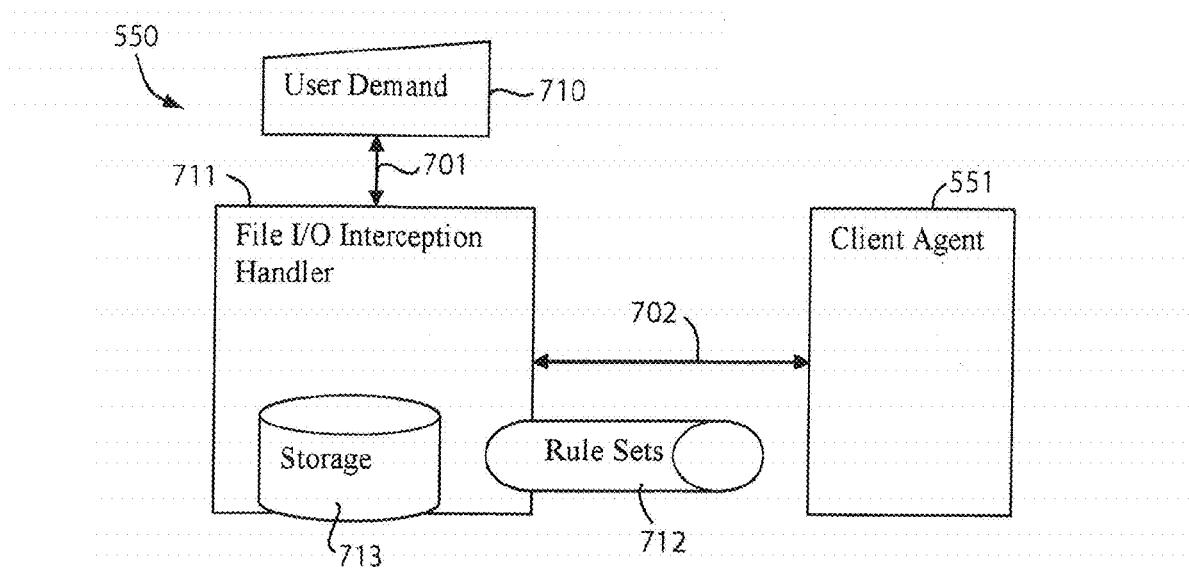
FIG. 7 schematically shows a client computer equipped with a file I/O interception handler with rule sets and a client agent in accordance with an embodiment of the present invention.

In the example of FIG. 7, the computer 550 further includes a file I/O interception handler 711 and rule sets 712. The handler 711 may comprise computer-readable program code for intercepting file access events, such as file I/O operations to one or more storage devices 713. In one embodiment, the handler 711 is configured to intercept a file access event and perform a corresponding course of action indicated in the rules sets 712. The rule sets 712 may include a plurality of rules or policies for handling file access events. The rule sets 712 may specify performance of a particular action when a particular a file access event to a particular file occurs. For example, a rule in the rule sets 712 may dictate requesting scanning in the cloud of a Microsoft Power Point™ application or sending out a notification upon receipt of an event indicating that a process is opening or executing the file "POWERPNT.EXE" stored in the storage device 713. A rule in the rule sets 712 may also specify scanning in the cloud of any file being opened or executed.

In the example of FIG. 7, the handler 711 intercepts a file access event resulting from a user demand 710 to access a file in the storage device 713 (arrow 701). The handler 711 consults the rule sets 712 to determine if there is a rule or policy governing access to the file. In this case, the rule sets 712 indicate scanning the file for malicious codes upon receipt of any file access event to the file. Accordingly, the handler 711 sends a scan request to the client agent 551 (arrow 702). The client agent 551 performs scanning in the cloud on the file as previously explained with reference to FIG. 5, and returns the scan result to the handler 711 (arrow 702).

The rule sets 712 may also include a rule or policy prohibiting modification of one or more files in a particular file folder. For example, the rule sets 712 may indicate blocking of file access events modifying a file located in a system relative folder, which may be a Microsoft Windows™ or Program Files folder, for example. As a particular example, a file "WINWORD.EXE" may be located in such a system relative folder. When an unknown malicious code tries to infect Microsoft Word™ by opening "WINWORD.EXE," the handler 711 will intercept the file access event and try to perform scanning in the cloud on "WINWORD.EXE." Unfortunately, the malicious code may be so new that there is no pattern available for it or the scan server 556 is unavailable (e.g., network is down, computer 570 is down, etc.). In other words, scanning for malicious codes is not feasible in this case. Still, the handler 711 will intercept the file access to "WINWORD.EXE" in the system relative folder and find that a rule or policy in rule sets 712 dictate blocking file access to any file in the system relative folder. This advantageously prevents the unknown malicious code from infecting the file even when there is no way to detect the malicious code at that time, such as when scanning in the cloud is not available or ineffective due to absence of pattern.

To distinguish between a legitimate patch and a malicious code modification, a rule in the rule sets 712 may allow writing that begins from the top (i.e., first address) or default file pointer location upon opening of an executable file but not writing that begins at another location, such as the bottom of the file. This rule essentially looks for malicious code behavior of moving the file pointer to the bottom of the file to modify the end of the file before modifying the entry point in the PE header.

Figure 8:
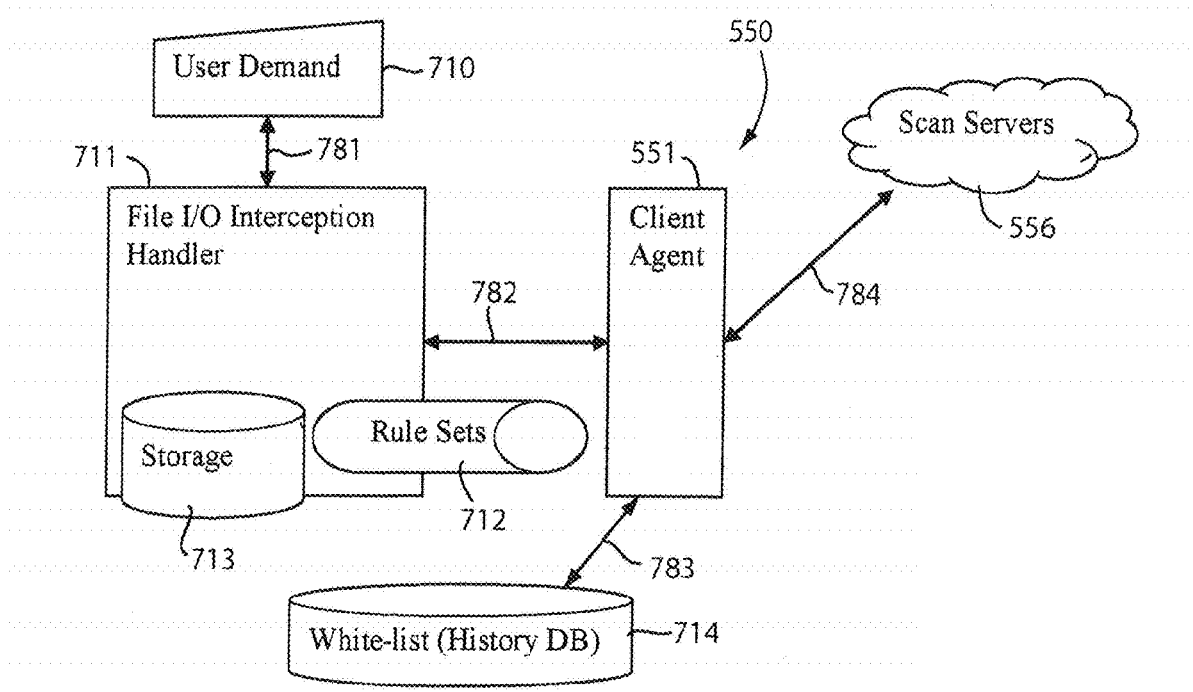
FIG. 8 schematically shows a client computer with a file I/O interception handler with rule sets, a file cache in the form of a white list, and a client agent in accordance with an embodiment of the present invention.

File behavior monitoring and scanning in the cloud may be used in conjunction with a file cache to reduce traffic on the computer network and for improved performance. In the example of FIG. 8, the computer 550 further includes a file cache in the form of a white list 714, which is also referred to as a "history database." The white list 714 may comprise a listing of files that have already been scanned for malicious codes. The white list 714 serves as a file cache of scanned files and may be consulted prior to performing scanning in the cloud. This prevents unnecessary use of network bandwidth in cases where a scan request is for a file that has already been scanned and has not been modified since. In one embodiment, the white list 714 indicates for each listed file a modify time stamp, file length, and checksum. The client agent 551 may compare the checksum of a file to be scanned and a file listed in the white list 714 for identification purposes.

In the example of FIG. 8, the file I/O interception handler 711 intercepts a file access event resulting from user demand 710 to access a target file (arrow 781). As previously discussed with reference to FIG. 7, the handler 711 consults the rule sets 712 to determine a course of action, if any. In cases where the rules sets 712 dictate scanning the target file for malicious codes, the handler 711 passes a corresponding scan request to the client agent 551 (arrow 782). Prior to sending a scan request to one of several scan servers 556 that may be available on the network, the client agent 551 first consults the white list 714 (arrow 783) to determine if the target file has already been scanned and has not been modified since that last scanning (e.g., using the modify date stamp and checksum as indicators). If so, the client agent 551 does not have to send a scan request to a scan server 556 and simply returns the scan result, which is "no malicious code found" in this case, to the handler 711. Otherwise, the client agent 551 sends a scan request to a scan server 556 to scan the target file for malicious code (arrow 784). The scan server 556 scans the target file and returns the scan result to the client agent 551 (arrow 784). The client agent 551 forwards the scan result to the handler 711 (arrow 782). If the scan result indicates that the target file is clean (i.e., not infected with malicious code), the client agent 551 caches the scan result by including an entry for the target file in the white list 714 (arrow 783).

A file may include a digital signature that authenticates the file as coming from a particular source. The use of digital signatures is becoming more popular with software vendors. To take advantage of this, the client agent 551 may employ conventional digital signature checking to determine whether or not a file with corresponding digital signature is from its legitimate source or has been tampered with prior to scanning. The client agent 551 may check the digital signature of a file before initiating scanning of the file for malicious codes to determine whether or not the file needs to be scanned, reducing network traffic and improving performance.

Figure 9:
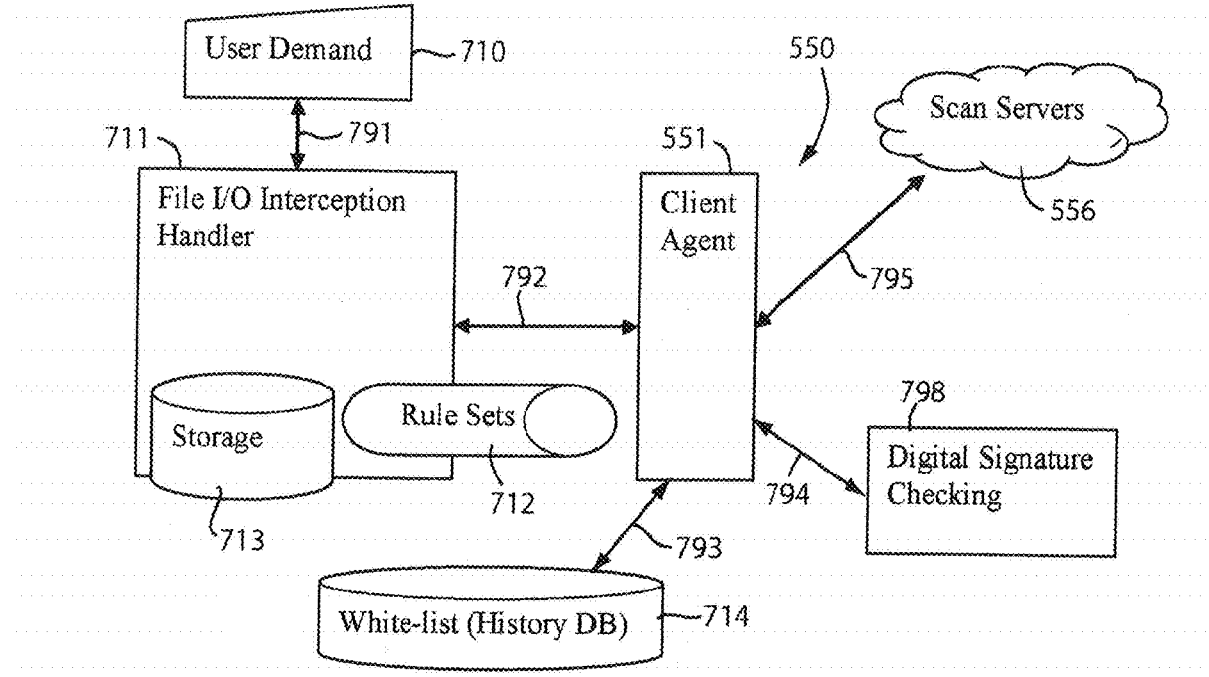
FIG. 9 schematically shows a client computer with a file I/O interception handler with rule sets, a file cache in the form of a white list, a digital signature checking module, and a client agent in accordance with an embodiment of the present invention.

In the example of FIG. 9, the computer 550 further includes a digital signature checking module 798. The module 798 may comprise computer-readable program code for checking the digital signature, if any, of a file for authentication purposes. As before, the file I/O interception handler 711 may intercept a file access event resulting from user demand 710 to access a target file (arrow 791). The handler 711 consults the rule sets 712 to determine a course of action, if any, that is responsive to the file access event. In cases where the rules sets 712 dictate scanning the target file for malicious codes, the handler 711 passes a corresponding scan request to the client agent 551 (arrow 792). Prior to sending a corresponding scan request to one of several scan servers 556 that may be available on the network, the client agent 551 first consults the white list 714 to determine if the target file has already been scanned and has not been modified since that last scanning (arrow 793). If so, the client agent 551 does not have to send a scan request to a scan server 556 and simply returns the scan result that the target file is clean to the handler 711. Otherwise, the client agent 551 requests the digital signature checking module 798 to check the digital signature, if any, of the target file (arrow 794).

If the target file has a valid digital signature, the client agent 551 deems the target file as clean and so informs the handler 711. Otherwise, the client agent 551 sends a scan request to a scan server 556 to scan the target file for malicious codes (arrow 795). The client agent 551 forwards the corresponding scan result from the scan server 556 to the handler 711. If the scan result indicates that the target file is clean, the client agent 551 caches the scan result by including an entry for the target file in the white list 714 (arrow 793).

Figure 10:
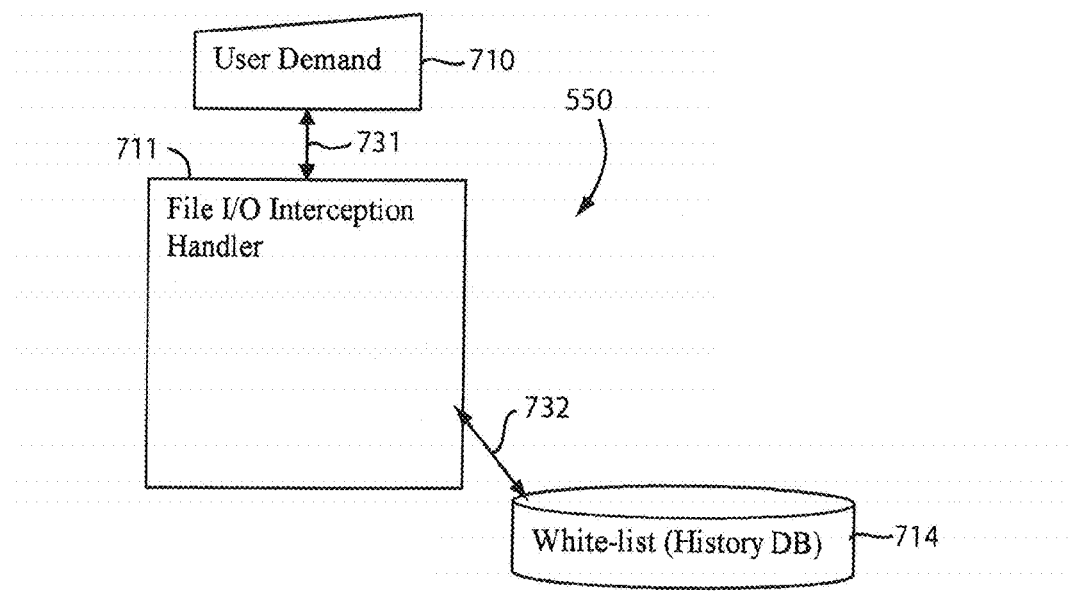
FIG. 10 schematically shows the maintenance of a file cache in accordance with an embodiment of the present invention.

The file I/O interception handler 711 may also be configured to perform maintenance of the white list 714. The handler 711 may intercept and monitor file access events to determine which files have been recently modified. The handler 711 may be configured to delete from the white list 714 entries or records of files that have been previously scanned for malicious codes and found clean but then modified in a subsequent file access event (e.g., file modify, write, or append). This is schematically illustrated in FIG. 10, where the handler 711 intercepts a file access event (arrow 731) indicating that a target file has been modified or written to in response to user demand 710. If the target file has an entry in the white list 714, the handler 711 deletes that entry (arrow 732) to allow the target file to be scanned again for malicious codes.

Figure 11:
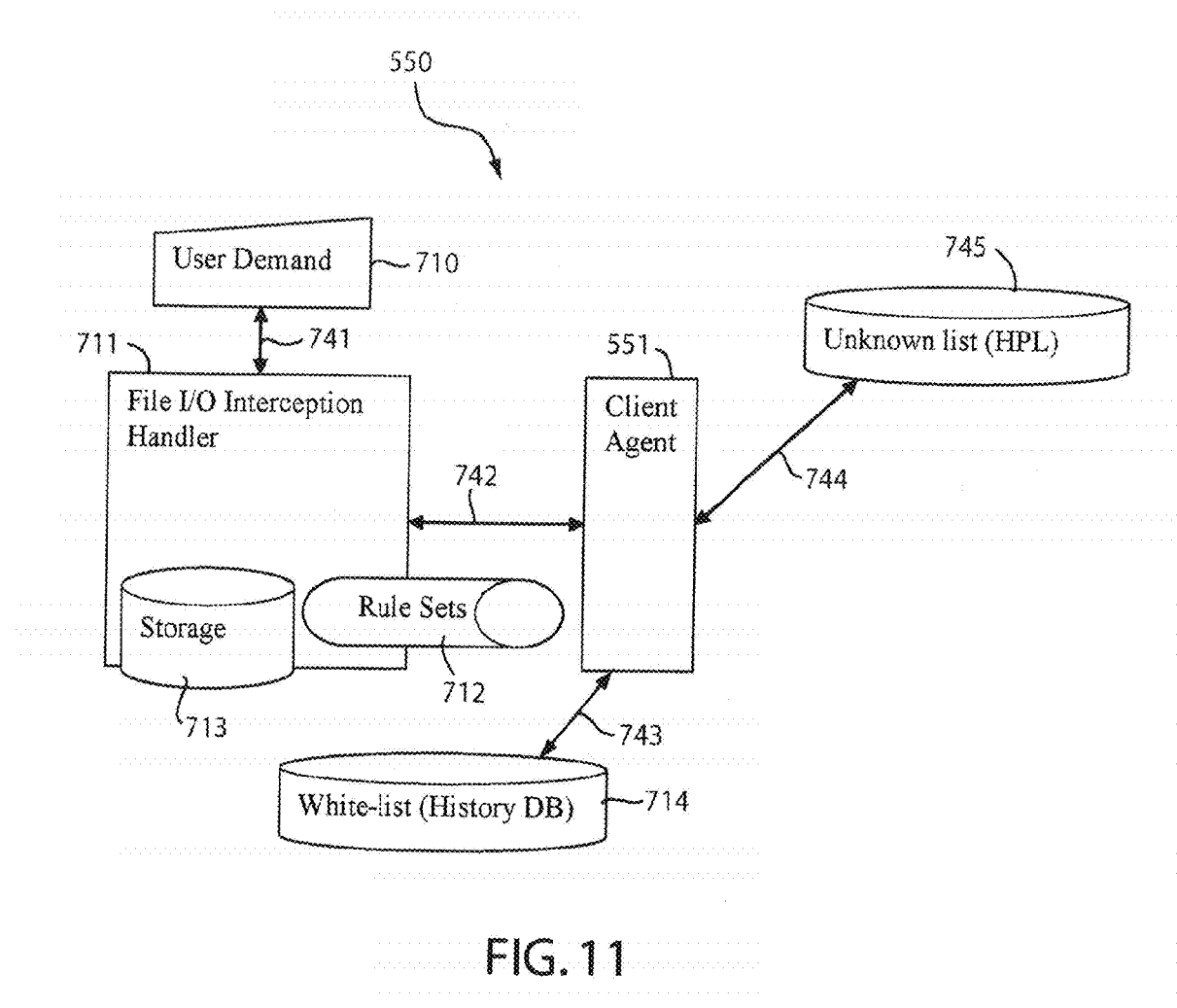
FIG. 11 schematically shows a client computer with a file I/O interception handler with rule sets, a file cache in the form of a white list, an unknown list, and a client agent in accordance with an embodiment of the present invention.

In situations where the client computer 550 is off-line, the client agent 551 may have no way of initiating scanning in the cloud. In this case, the client agent 551 may maintain a listing of files that need to be scanned for malicious codes when the client computer 550 goes back online. In the example of FIG. 11, the computer 550 further includes an unknown list 745. The unknown list 745 is also referred to as a high-priority list (HPL) as it includes a listing of files that need to be scanned for malicious codes as soon as possible, on a high-priority basis when the network becomes available. The unknown list 745 may indicate the file name, location, and other information to allow the file to be located and scanned for malicious codes.

Still referring to FIG. 11, the file I/O interception handler 711 may intercept a file access event resulting from user demand 710 to access a target file (arrow 741). The handler 711 consults the rule sets 712 to determine a course of action, if any, that is responsive to the file access event. In cases where the rules sets 712 dictate scanning the target file for malicious codes, the handler 711 passes a corresponding scan request to the client agent 551 (arrow 742). Prior to sending a corresponding scan request to one of several scan servers 556 that may be available on the network, the client agent 551 first consults the white list 714 to determine if the target file has already been scanned and has not been modified since that last scanning (arrow 743). If so, the client agent 551 does not have to send a scan request to a scan server 556 and simply returns the scan result that the target file is clean to the handler 711. Otherwise, the client agent 551 would initiate scanning in the cloud by sending a scan request to a scan server 556. However, in this case, the computer 550 is off-line, preventing communication with a scan server 556 over the network. Accordingly, the client agent 551 creates an entry for the target file in the unknown list 745 (arrow 744). Once the network becomes available, the client agent 551 would go through the entries in the unknown list 745 to scan the indicated files for malicious codes by sending corresponding scan requests to one or more scan servers 556. This scanning may be performed at high priority, before any other scanning or file access is allowed.

File behavior monitoring using the file I/O interception handler 711 and the rule sets 712 may also be performed in conjunction with a local, rather than remote, scan engine. Although file behavior monitoring is typically thin in that it does not consume a lot of memory and processor resources, performing pattern matching locally may be a resource burden due to the large number of known malicious codes, and thus corresponding large size of malicious code patterns. To overcome this problem, in one embodiment, file behavior monitoring is implemented as a first line of defense against malicious codes, with categorized pattern matching being performed only for suspicious file access events. This embodiment of the present invention is now explained with reference to FIGS. 12 and 13.

Figure 12:
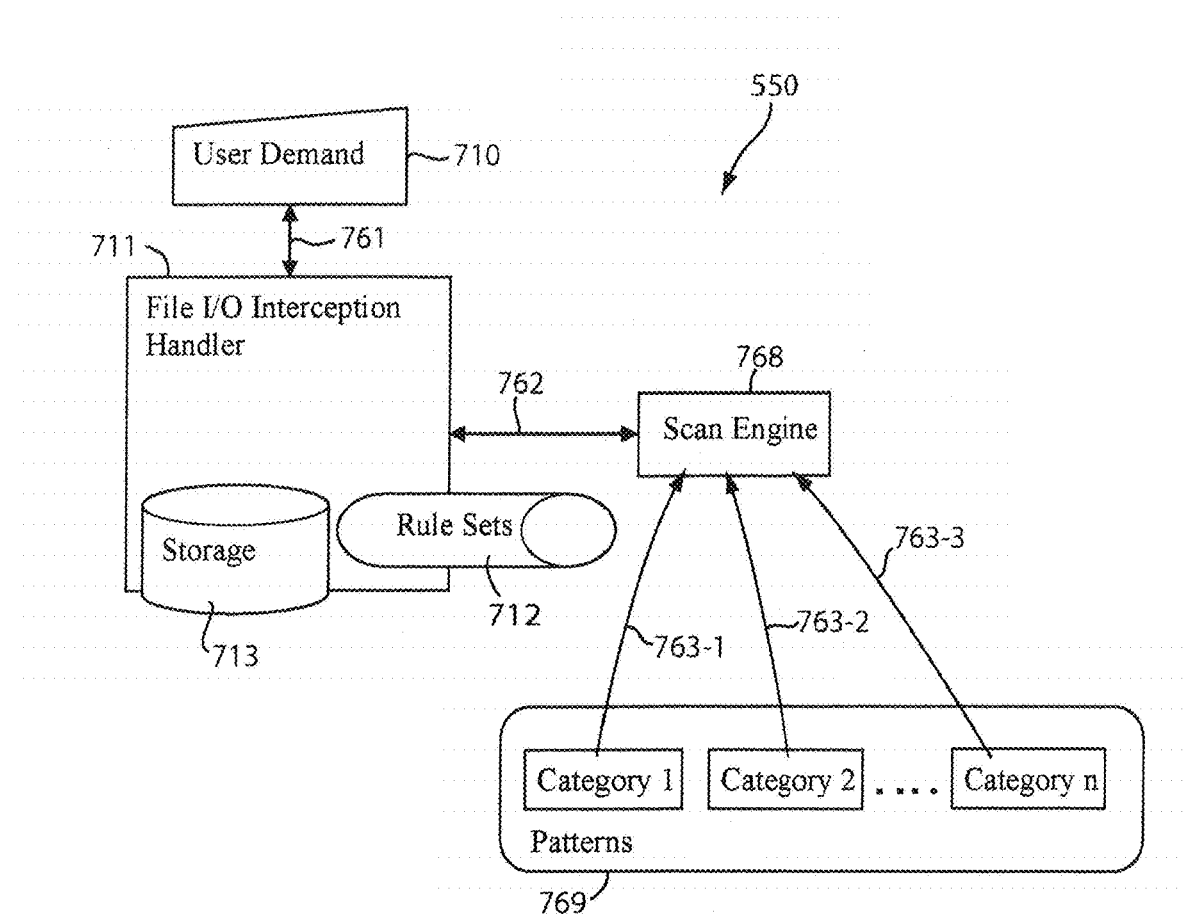
FIG. 12 schematically shows a client computer with a file I/O interception handler with rule sets and a scan engine with categorized patterns in accordance with an embodiment of the present invention.

In the example of FIG. 12, the computer 550 includes a scan engine 768 and patterns 769 in place of the client agent 551. This is because the computer 550 of FIG. 12 is configured for local scanning rather than scanning in the cloud. Of course, the computer 550 may also retain the client agent 551 and other modules disclosed herein depending on the application. For example, the computer 550 of FIG. 12 may include a white list, digital signature checking module, etc.

The scan engine 768 uses the patterns 769 to scan data for malicious codes using a pattern matching algorithm. The patterns 769 may comprise patterns and other information for detecting malicious codes. In one embodiment, the patterns 769 are grouped into categories of data to be scanned. For example, the patterns 769 may include a first group of patterns for files of a first category (e.g., exe files), a second group of patterns for files of a second category (e.g., macros or scripts), and so on. This allows a scan engine 768 to load into memory only those patterns pertinent to the target file to be scanned, thereby reducing memory consumption and scanning time. To further reduce memory consumption and scanning time, the handler 711 may be configured to load the scan engine 768 and/or associated category of patterns only when the file access is suspicious, such as when the rules sets 712 indicate the need for scanning. The handler 711 and rule sets 712 form a file behavior monitoring engine that together with the scan engine 768 and patterns 769 is referred to herein as a "hybrid engine."

Still referring to FIG. 12, the file I/O interception handler 711 may intercept a file access event resulting from user demand 710 to access a target file (arrow 761). The handler 711 consults the rule sets 712 to determine a course of action, if any, that is responsive to the file access event. In cases where the rules sets 712 dictate scanning the target file for malicious codes, the handler 711 loads the scan engine 768 into main memory and sends a scan request to the scan engine 768 to scan the target file for malicious codes (arrow 762). The scan engine 768 checks the category of the target file and loads into memory a group of patterns among a plurality of groups of patterns corresponding to the category of the target file (arrow 763-1, arrow 763-2, or arrow 763-3). For example, if the target file is a ".exe" executable file, the scan engine 768 loads into memory the corresponding patterns for the category ".exe" executable files, but not patterns for irrelevant categories of files. The scan engine 768 may scan the target file for malicious codes using the loaded patterns and provides the scan result to the handler 711. The handler 711 may then release the scan engine 768 and/or the loaded patterns by closing them to free up memory space.

Figure 13:
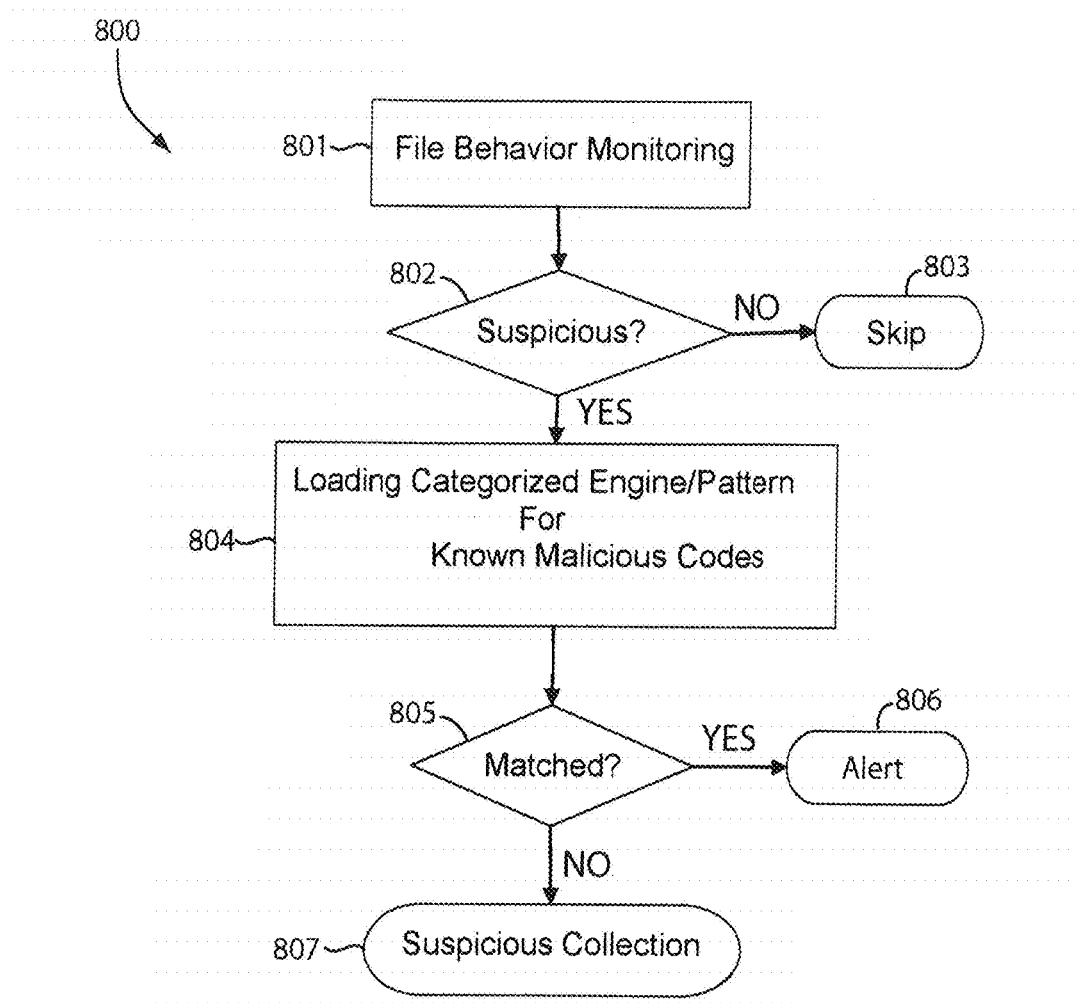
FIG. 13 shows a flow diagram of a method of detecting malicious codes using a hybrid engine in accordance with an embodiment of the present invention.

FIG. 13 shows a flow diagram of a method 800 of detecting malicious codes using a hybrid engine in accordance with an embodiment of the present invention. The method 800 is explained using the components shown in FIG. 12 for illustration purposes only. Other components may also be used without detracting from the merits of the present invention.

File behavior monitoring may be performed by the file I/O interception handler 711 in conjunction with the rule sets 712 to detect suspicious file access events (step 801). The rest of the method 800 does not have to be performed for file access events that are not suspicious (step 803). Non-suspicious file access events may include those that do not have a corresponding rule or policy in the rule sets 712. For suspicious file access events, such as those with a governing rule or policy in the rule sets 712, the handler 711 loads the scan engine 768, which then loads a group of patterns corresponding to the category of the target file (step 804). The scan engine 768 scans the target file for malicious codes using the loaded group of patterns. The handler 711 issues an alert if malicious code is found in the target file (i.e., content of the target file matches a pattern) (step 806). The alert may initiate cleaning of the target file.

The target file is probably clean when the scan engine 768 cannot find a match between the loaded group of patterns and the contents of the target file. However, because the file behavior monitoring indicated that the target file is suspicious, the target file is preferably indicated in a suspicious list (step 807) to allow the target file to be further examined at a later time. That is, since the target file appears to be suspicious, the target file may be infected with an unknown malicious code. Copies of files indicated in the suspicious list may be forwarded to an antivirus research facility, such as the Trend Labs™ antivirus research center of Trend Micro, Inc., for further examination.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of scanning a file for malicious codes, the method comprising:

grouping malicious code patterns into a plurality of groups of malicious code patterns for different categories of files, each group of malicious code patterns in the plurality of groups of malicious code patterns comprising malicious code patterns that are grouped for scanning a particular category of files;

intercepting a file access event to access a file in a computer;

determining a category of the file;

selecting a group of malicious code patterns from among the plurality of groups of malicious code patterns for the category of the file;

loading the selected group of malicious code patterns into a memory of the computer where the file access event is detected;

determining that the file access event is a suspicious file access event by applying a rule set associated with the file access event, the rule set including a rule that identifies a malicious code behavior of modifying an entry pointer in a header of the file to point to a section comprising malicious code; and in response to determining that the file access event is a suspicious file access event, scanning the file and detecting for malicious codes in the computer using the selected group of malicious code patterns by matching contents of the file with malicious code patterns in the selected group of malicious code patterns.

2. The method of claim 1, wherein the file belongs to the category of files with a ".exe" file extension.

3. The method of claim 1, wherein the file belongs to the category of files that are macro or script files.

4. A computer comprising:

a processor and a memory, the memory comprising instructions stored thereon that when executed by the processor cause the computer to:

provide a plurality of groups of malicious code patterns for different categories of files, each group of malicious code patterns in the plurality of groups malicious code patterns comprising malicious code patterns that are grouped for scanning a particular category of files;

intercept a file access event to access a file;

determine a category of the file;

select a group of malicious code patterns from among the plurality of groups of malicious code patterns for the category of the file;

load the selected group of malicious code patterns into the memory of the computer;

determine that the file access event is a suspicious file access event by applying a rule set associated with the file access event, the rule set including a rule that identifies a malicious code behavior of modifying an entry pointer in a header of the file to point to a section comprising malicious code; and in response to the determination that the file access event is a suspicious file access event, scan the file and detect for malicious codes in the computer using the selected group of malicious code patterns by matching contents of the file with malicious code patterns in the selected group of malicious code patterns.

5. The computer of claim 4, wherein the file belongs to the category of files with a ".exe" file extension.

6. The computer of claim 4, wherein the file belongs to the category of files that are macro or script files.

* * * * *